(12) United States Patent
Sayegh et al.

(10) Patent No.: US 7,008,183 B2
(45) Date of Patent: Mar. 7, 2006

(54) DEFLECTOR EMBEDDED IMPINGEMENT BAFFLE

(75) Inventors: Samir Dimitri Sayegh, Melrose, MA (US); Glen William Royal, Cincinnati, OH (US); Massimo Rufo, Woburn, MA (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 10/746,092

(22) Filed: Dec. 26, 2003

(65) Prior Publication Data
US 2005/0141989 A1    Jun. 30, 2005

(51) Int. Cl.
F01D 9/02 (2006.01)
(52) U.S. Cl. .................. 415/173.1; 415/115; 415/196; 415/208.1
(58) Field of Classification Search ................ 415/115, 415/116, 173.1, 173.3, 173.4, 173.6, 196, 415/208.1, 228
See application file for complete search history.

(56) References Cited

U.S. PATENT DOCUMENTS

| 3,583,824 | A |   | 6/1971  | Smuland              |          |
|-----------|---|---|---------|----------------------|----------|
| 4,497,610 | A |   | 2/1985  | Richardson et al.    |          |
| 4,573,867 | A |   | 3/1986  | Hand                 |          |
| 5,273,396 | A | * | 12/1993 | Albrecht et al. .........| 415/173.1|
| 5,584,651 | A |   | 12/1996 | Petraszkiewicz et al.|          |
| 5,669,757 | A |   | 9/1997  | Brackett             |          |

* cited by examiner

Primary Examiner—Edward K. Look
Assistant Examiner—Dwayne J. White
(74) Attorney, Agent, or Firm—William S. Andes; Francis L. Conte

(57) ABSTRACT

An impingement baffle includes a perforate plate having a pattern of impingement holes. An imperforate deflector is spaced from the plate and is smaller than the plate for deflecting inlet air around the deflector to the holes. The baffle is disposed between a turbine shroud and supporting hanger, and the deflector is disposed between the hanger and the baffle.

20 Claims, 4 Drawing Sheets

DEFLECTOR EMBEDDED IMPINGEMENT BAFFLE

The U.S. Government may have certain rights in this invention pursuant to contract number DAAE07-00-C-N086 awarded by the U.S. Department of the Army.

BACKGROUND OF THE INVENTION

The present invention relates generally to gas turbine engines, and, more specifically, to turbines therein.

In a gas turbine engine, air is pressurized in a compressor and mixed with fuel in a combustor for generating hot combustion gases. Energy is extracted from the combustion gases in several turbine stages which power the compressor, and produce additional power for powering an upstream fan in a turbofan aircraft application, or in driving an external shaft for a land or marine vehicle.

A typical turbine stage includes a turbine nozzle having a row of stator vanes which direct the combustion gases into a corresponding row of turbine rotor blades extending radially outwardly from a supporting rotor disk. A turbine shroud surrounds the rotor blades and provides a small clearance or gap with the blade tips for minimizing undesirable combustion gas leakage therepast.

The first stage turbine receives the hottest combustion gases from the combustor and requires cooling for ensuring a suitable useful life thereof. Cooling air is bled from the compressor and channeled through the hollow nozzle vanes and rotor blades for providing internal cooling thereof. Additional air is bled from the compressor and is channeled to the surrounding turbine shrouds for cooling thereof.

The prior art is crowded with various configurations for cooling the nozzle vanes, turbine blades, and turbine shrouds which vary in complexity and effectiveness. The amount of cooling air should be minimized for maximizing efficiency of the engine, yet sufficient air must be used for ensuring suitable component life.

Large gas turbine engines have correspondingly large vanes, blades, and shrouds which permit various forms of cooling configurations therein. However, small gas turbine engines have correspondingly smaller vanes, blades, and shrouds and therefore have limited space in which the cooling features may be incorporated, and correspondingly limit the types of cooling configurations which may be used.

For example, the turbine shrouds which surround the blade tips include conventional rails that mount in complementary supporting hooks in a hanger which limits the available space for introducing cooling features therein. The hanger itself includes rails which are mounted in complementary hooks in a hanger support, which support in turn is suitably mounted to a surrounding outer casing, such as the combustor case.

The nested configuration of the turbine shroud, supporting hanger, hanger support, and outer casing require suitable air circuits extending therethrough disposed in flow communication with the compressor for providing a portion of the compressor discharge pressure (CDP) air to cool the shrouds.

Shrouds themselves are typically formed in arcuate segments of a suitable high strength metal for withstanding the hot combustion gases, with the inner surface of the shroud typically being covered by a ceramic thermal barrier coating (TBC) joined to the shroud by an intervening metallic bond coat. The TBC provides effective thermal insulation for reducing the heat loads transmitted into the supporting shroud.

The shroud itself is typically cooled on its outer surface by the air bled from the compressor. Enhanced cooling of the shroud is typically provided by incorporating a thin sheet impingement baffle perforated with a pattern of small impingement holes. The baffle is suitably spaced outwardly of the shroud so that the cooling air is channeled through the individual impingement holes creating small jets of cooling air that impinge the back surface of the shroud for providing enhanced cooling thereof.

The cooling air is typically provided to the impingement baffle through corresponding inlet holes extending through the hanger either radially therethrough, or inclined therethrough with substantially axial orientation. In either configuration, a small number of large hanger inlets are provided around the circumference of the annular shroud support to feed the substantially larger number of small impingement holes found in the several segments of impingement baffles aligned circumferentially around the corresponding turbine shrouds.

In the large gas turbine engines, adequate space is typically available to discharge the large jets of cooling air through the hanger inlets with sufficient diffusion around the impingement baffles for reducing the velocity of the incoming air while increasing the static pressure thereof. In this way, a generally uniform static pressure distribution may be provided in the incoming cooling air to ensure substantial uniformity of impingement cooling through the multitude of impingement holes in the several impingement baffles.

However, in small gas turbine engines, or in large engines where space is limited, the configuration and orientation of the hanger inlets may be constrained and thereby limits the ability to adequately diffuse the cooling air prior to engagement with the impingement baffles.

Tests have been conducted in one type of small gas turbine engine in which the hanger inlets create corresponding jets of cooling air outside the impingement baffles with limited diffusion prior to passage through the impingement holes. The tests indicate that the high velocity jets of cooling air discharged from the hanger inlets can create local zones of relatively low static pressure, and correspondingly low flowrates of air through the local impingement holes. In this situation, the impingement holes within the direct local affects of the inlet jets are less effective for impingement cooling the backside of the turbine shrouds than those remote impingement holes offset laterally from the hanger inlets.

Accordingly, it is desired to provide an improved configuration for impingement cooling turbine shrouds notwithstanding the local jet flow from the hanger inlets.

BRIEF DESCRIPTION OF THE INVENTION

An impingement baffle includes a perforate plate having a pattern of impingement holes. A deflector is spaced from the plate and is smaller than the plate for deflecting inlet air around the deflector to the holes. The baffle may be disposed between a turbine shroud and supporting hanger, and the deflector may be disposed between the hanger and the baffle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
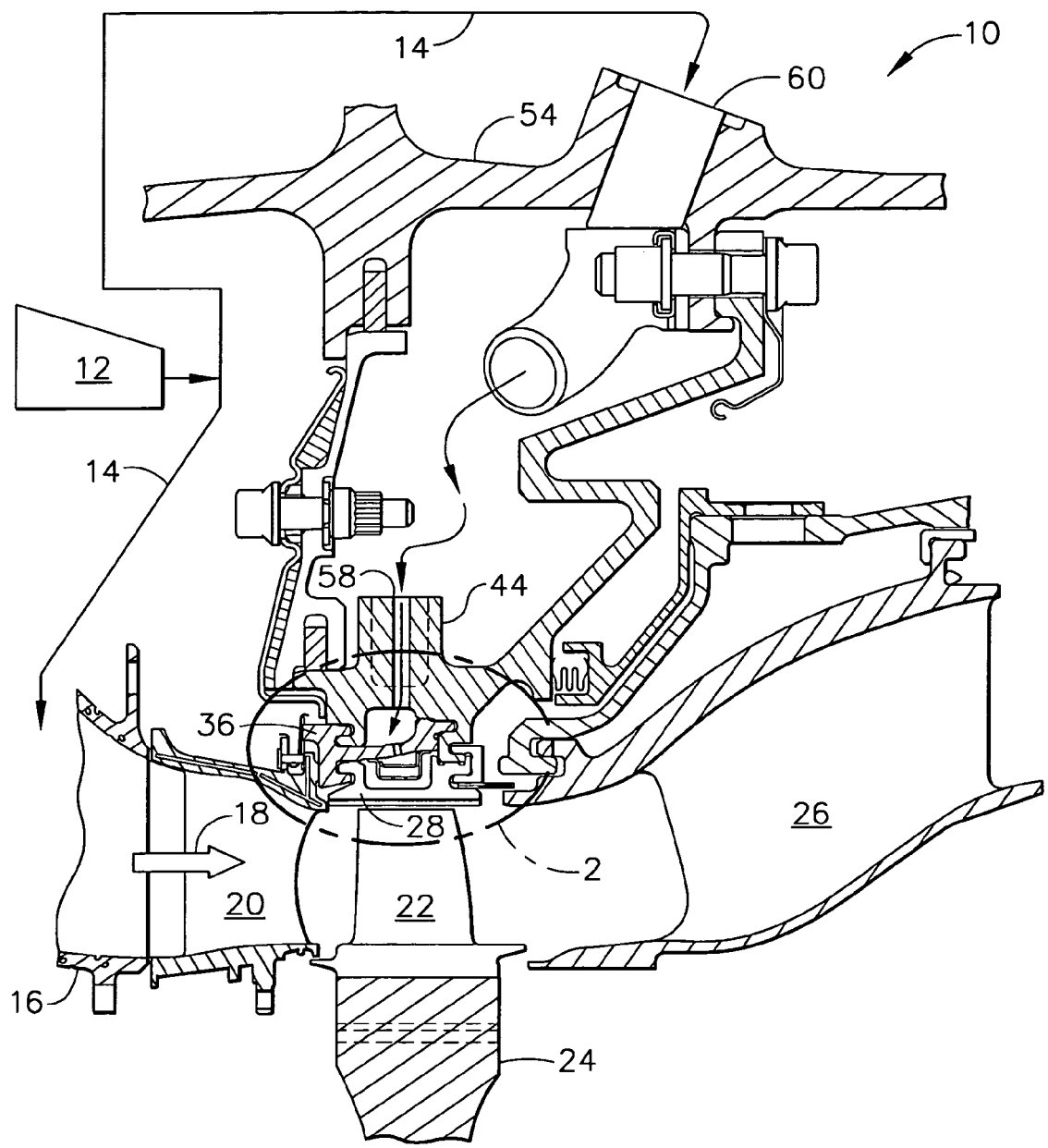
FIG. 1 is an axial, partly sectional and schematic view of exemplary portion of a gas turbine engine including a preferred configuration for cooling turbine shrouds therein.

Illustrated schematically in FIG. 1 is a portion of a gas turbine engine 10 which is axisymmetrical about a longitudinal or axial centerline axis. The engine includes a multistage compressor 12 which pressurizes air 14 which is discharged into an annular combustor 16, shown in aft part. The air is mixed with fuel in the combustor and ignited for generating hot combustion gases 18.

The combustion gases are discharged into a high pressure turbine (HPT) which includes an annular turbine nozzle having a row of hollow nozzle vanes 20 extending radially between outer and inner bands. The nozzle may have any conventional configuration and directs the combustion gases downstream into a corresponding row of first stage turbine rotor blades 22 extending radially outwardly from a supporting rotor disk 24, shown in outer part. The rotor disk is suitably joined to the corresponding rotor of the compressor by a drive shaft extending axially therebetween to power the compressor from energy extracted from the combustion gases by the turbine blades 22 during operation.

Between the high pressure turbine blades 22 and the low pressure turbine (LPT, not shown) is the inter-turbine duct which includes a row of hollow strut vanes 26 extending radially between outer and inner bands. The LPT includes two stages located downstream from the strut vanes 26. Each LPT stage includes a row of nozzle vanes followed by a row of turbine blades that are joined to another drive shaft which may be used for powering a fan in a turbofan aircraft engine application, or joined to a transmission for powering a vehicle for land or marine use as desired.

The compressor, combustor, turbine blades and vanes may have any conventional configuration as desired for the particular engine application. The engine may be relatively large and high powered, or may be relatively small or low powered in the particular configuration illustrated schematically in FIG. 1.

As indicated above, smaller gas turbine engines have correspondingly smaller space or volume in which various components may be mounted, which affects the ability to introduce suitable cooling therein.

Figure 2:
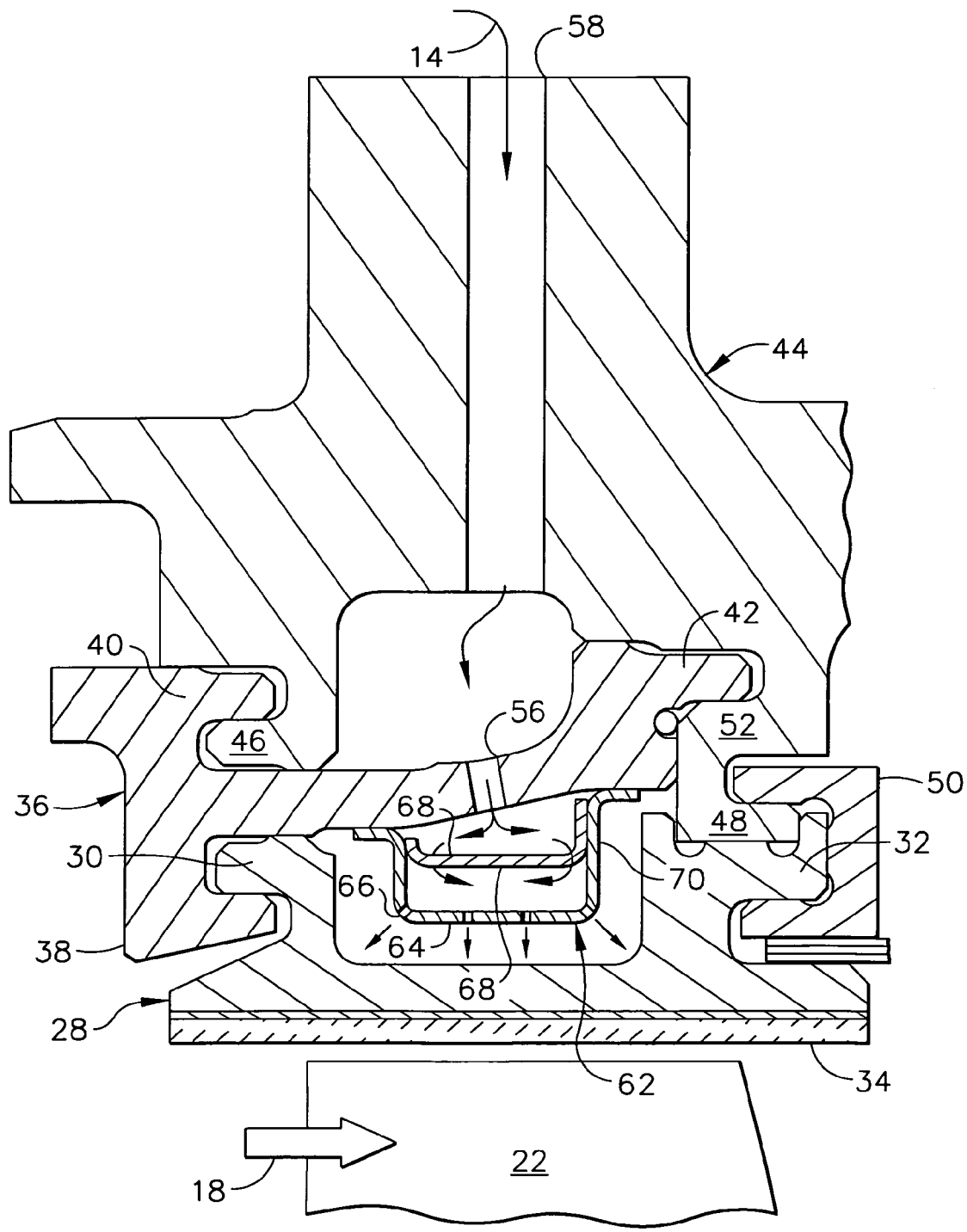
FIG. 2 is an enlarged axial sectional view of the turbine shroud region illustrated in FIG. 1 within the dashed circle labeled 2.

For example, the high pressure turbine illustrated in FIG. 1 includes a turbine shroud 28 surrounding the row of blades 22, and is illustrated in enlarged view in FIG. 2. The turbine shroud may have any conventional configuration and is typically formed in arcuate segments which collectively form a full annular ring around the radially outer tips of the row of blades 22.

Each shroud includes a forward rail 30 and an axially opposite aft rail 32 extending axially opposite to each other from corresponding radial flanges on the back or outer side of shroud. The radially opposite, inner side of the shroud is typically covered with a conventional ceramic thermal barrier coating (TBC) 34 which is bonded to the substrate metal of the shroud by an intervening metallic bond coat therebetween in a conventional manner. The TBC surface of the shroud forms a relatively small radial clearance or gap with the tips of blades 22 for minimizing undesirable leakage of the combustion gases 18 therebetween during operation.

FIG. 2 also illustrates an arcuate shroud hanger 36 which surrounds and supports the shrouds 28 in a conventional manner. For example, the hanger includes a forward hook 38 configured to complement the forward rail 30 of the shroud for engagement therewith to hang the forward end of the shroud. The hanger also includes a forward rail 40 disposed radially outwardly of the forward hook 38, and an aft rail 42 at the axially opposite aft end of the hanger.

Like the turbine shrouds, the shroud hanger 36 is formed in arcuate segments forming a complete annular assembly thereof in which the row of arcuate turbine shrouds 28 are supported.

An annular shroud or hanger support 44 surrounds and supports the row of hangers 36, yet again in a conventional configuration. For example, the shroud support includes a forward hook 46 which is complementary to the forward rail 40 of the hanger for engagement therewith to hang the forward end of the hanger.

The shroud support also includes an aft hook 48 configured to complement the aft rail 32 of the turbine shroud for support thereof using a suitable C-clip 50. A middle hook 52 is disposed radially outwardly of the aft hook 48 and complements the aft rail 42 of the hanger for hanging the aft end thereof.

The various rails and hooks of the shrouds, hangers, and shroud support have conventional configurations which permit the assembly of the components in simple tongue-in-groove joints so that the turbine shrouds 28 hang from the corresponding hangers 36, with the hangers 36 in turn hanging from the shroud support 44.

As shown in FIG. 1, an annular outer casing 54, such as the combustor case, surrounds the turbine and combustion sections of the engine, and includes a radially inner flange to which a corresponding outer flange of the shroud support 44 is suitably joined by a row of fasteners for example. The shrouds, hangers, shroud support, and outer casing are therefore suitably nested radially in turn for suspending or hanging the turbine shrouds directly above the row of first stage rotor blades 22 during operation.

In order to cool the row of turbine shrouds 28 during operation, a portion of the CDP air discharged from the outlet end of the compressor 12 is suitably channeled to the shrouds. For example, the shroud hangers 36 illustrated in FIG. 2 include a row of aperture inlets 56 extending therethrough. The shroud support 44 includes another row of longer aperture inlets 58 extending therethrough. And, the outer casing 54 illustrated in FIG. 1 includes yet another row of larger inlets 60 extending therethrough.

For example, four of the large casing inlets 60 may be spaced apart around the circumference of the casing to collectively feed the cooling air into the relatively large plenum defined outside the shroud support 44. The shroud support may have a substantially greater number of smaller inlets 58 therein, such as twenty-one for distributing the cooling air in turn into the small annular plenum defined between the row of hangers 36 and the shroud support. And, a fewer number of the hanger inlets 56, such as fourteen, may be provided in the row of hangers 36 for distributing the cooling air around the row of turbine shrouds.

Figure 3:
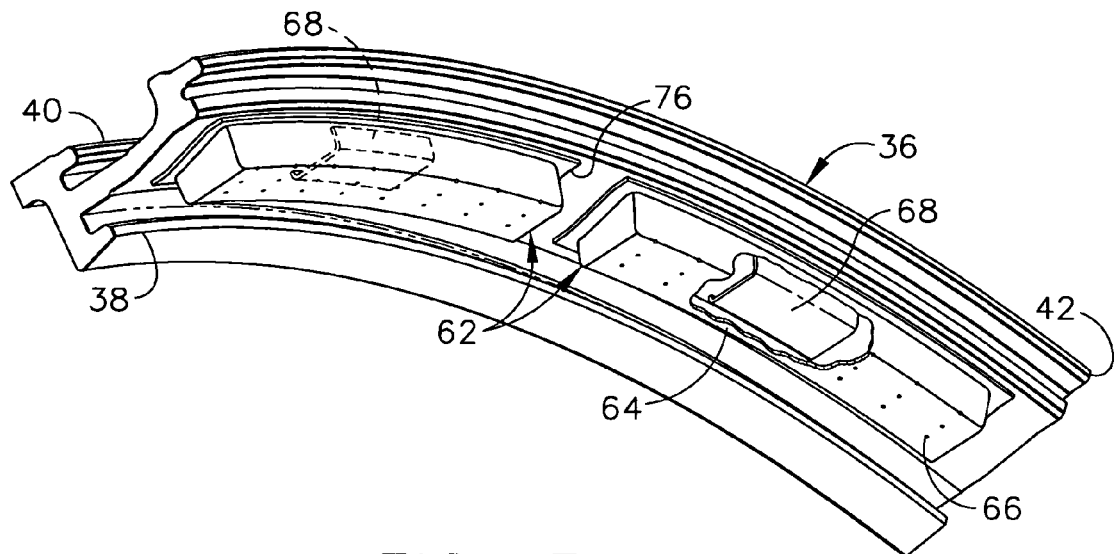
FIG. 3 is an isolated view of one of the shroud hangers illustrated in FIG. 2 supporting a pair of impingement baffles in one embodiment.
Figure 4:
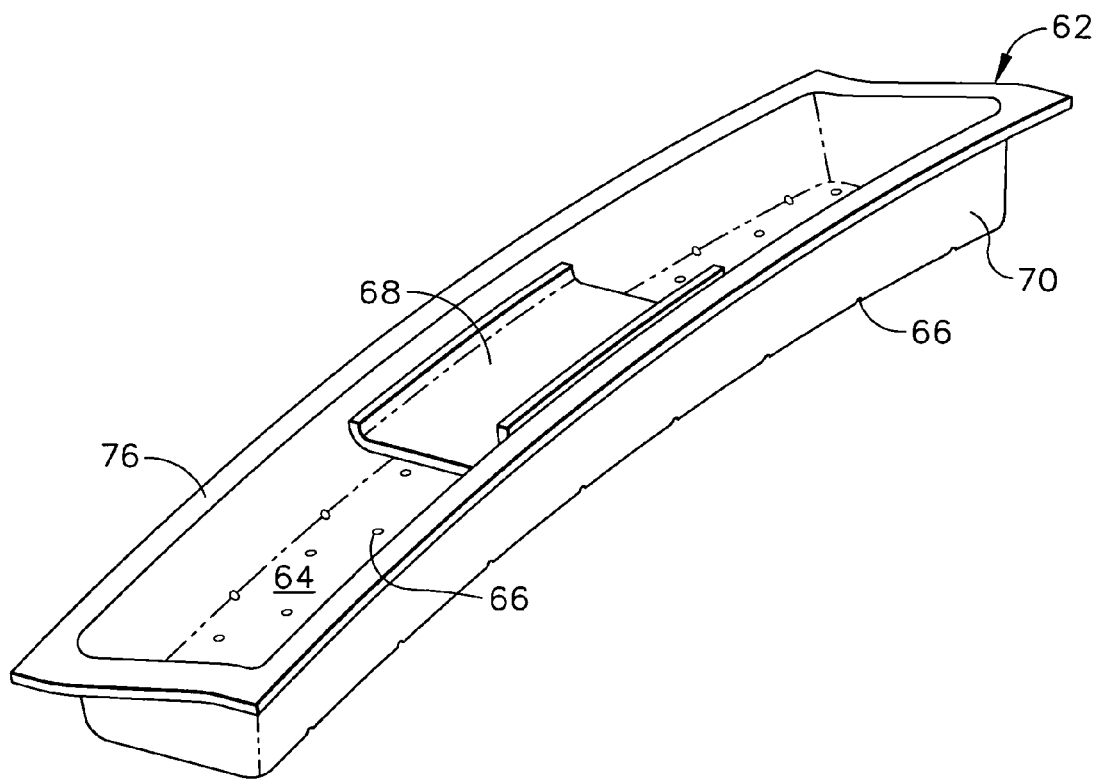
FIG. 4 is an isometric view of one of the impingement baffles illustrated in FIGS. 2 and 3, including a flow deflector mounted therein.

In order to improve the cooling effectiveness of the cooling air 14 provided to the turbine shrouds, a row of impingement baffles 62 is provided in the annular plenum defined between the row of hangers 36 and the row of shrouds 28 as illustrated initially in FIG. 2. FIG. 3 illustrates in isolation one of the hangers 36 that supports two of the impingement baffles 62 in a preferred embodiment. FIG. 4 illustrates one of the impingement baffles 62 in isolation.

Referring initially to FIG. 4, each impingement baffle 62 is formed of thin sheet metal and includes a floor plate 64 having a plurality of small impingement holes 66 extending therethrough in a suitable laterally or circumferentially distributed pattern. The impingement holes themselves may have any conventional configuration for discharging small jets of the cooling air 14 against the radially outer or back surface of the turbine shroud as illustrated in FIG. 2. For example, each impingement hole may be cylindrical with a diameter of about 14 mils (0.36 mm), although other hole sizes may be used depending on the particular application.

Each impingement baffle 62 itself may have any conventional configuration as required for the specific configuration of the cooperating turbine shroud and its supporting members. As shown in FIG. 2, the impingement baffles are located in the small plenum defined between the inner surface of the hanger 36 and the outer surface of the turbine shroud between the forward and aft rails thereof. In particular, the impingement baffle is located directly below one of the hanger inlets 56 and receives a relatively large jet of the cooling air therefrom during operation.

As indicated above, the large jets of cooling air discharged through the hanger inlets 56 during operation undergo dump diffusion in the larger volume of the plenum above the impingement baffle for reducing velocity while increasing static pressure. Yet such diffusion is incomplete in view of the small size of the plenum (i.e. the height of the plenum, or distance between the hanger inner surface at the flow inlet holes 56 and the impingement baffle floor 64) and the direct orientation of the incoming air jet.

Accordingly, the shroud cooling assembly or apparatus illustrated in FIG. 2 is modified to include a splashplate or deflector 68 which is suitably spaced radially outwardly from the floor plate 64 for providing a shield between the incoming air jet from the hanger inlet 56 and the impingement holes 66 formed in the baffle.

In this way, the deflector 68 is disposed radially between the perforate plate 64 of the baffle and the hanger in direct line-of-sight radial alignment with the hanger inlet 56 for laterally or circumferentially deflecting the incoming air 14 discharged from the inlet around the deflector 68 itself to the perforate plate 64 hidden therebehind.

The velocity of the incoming air is therefore spoiled or further diffused upon impinging the deflector 68, with the slower air then being diverted around the deflector for entering the full pattern of impingement holes 66 found in the floor plate 64. In this way, uniformity of the static pressure in the cooling air 14 may be improved around the circumferential extent of the impingement baffle without regard to the isolated location of the hanger inlets 56.

In the preferred embodiment, the deflector 68 is imperforate, without any holes or discontinuities therein. Testing of the imperforate flow deflector supports the improved cooling effectiveness of the impingement baffle notwithstanding the large jets of incoming air through the limited number of hanger inlets.

In alternate embodiments, the deflector could be perforate to otherwise disperse or further diffuse the incoming air prior to distribution through the impingement holes. Furthermore, some applications may use several deflectors integrated or nested in series within each other to achieve the desired diffusion.

As illustrated in FIG. 4, the floor plate 64 is circumferentially arcuate around the circumferential extent of the turbine shrouds relative to the axial centerline axis of the engine. The deflector 68 is spaced laterally inboard from the circumferentially opposite ends of the baffle plate for circumferentially aligning the deflector 68 with the corresponding hanger inlet 56. In this way, each inlet 56 provided in the shroud hangers may be mated with a corresponding deflector 68 radially aligned therewith so that the discharge jet from the hanger inlet hits the deflector generally in the middle thereof.

The deflector is substantially smaller or shorter in circumferential length than that of the arcuate impingement baffle since it need only be provided in the local regions directly below each hanger inlet. The deflector should not be too small which would inadequately disperse the incoming air or lead to undesirable non-uniformity in the static pressure distribution of the impingement air. And, the deflector should not be too large which would restrain free circulation of the incoming air to the impingement holes, or unnecessarily add weight to the engine, and correspondingly increasing cost.

As indicated above, the impingement baffle may have any suitable configuration, and in the preferred embodiment illustrated in FIG. 4 the floor plate 64 is integrally joined to the bottom of a surrounding perimeter wall 70 to form a trough or tub inside the baffle and fully open on its radially outer or convex side. The deflector 68 may be suitably disposed inside the baffle trough, and spaced above a portion of the baffle floor in which some of the impingement holes are found.

Figure 5:
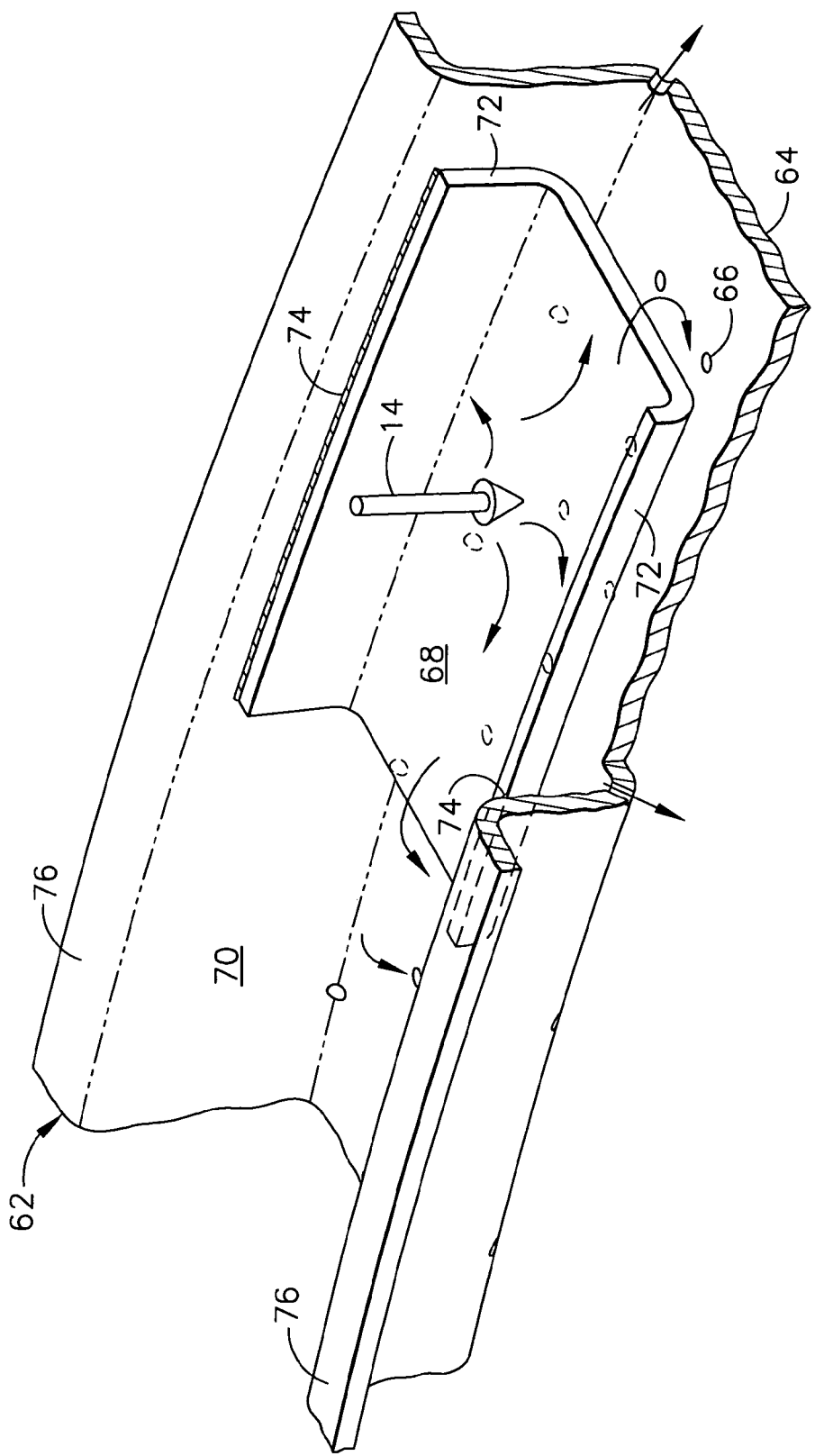
FIG. 5 is an enlarged, partly sectional view of a portion of the impingement baffle illustrated in FIG. 4 showing in greater detail the flow deflector mounted therein.

As illustrated in FIGS. 4 and 5, the deflector 68 axially bridges the opposite forward and aft portions of the perimeter wall 70 and is spaced inboard or circumferentially from the opposite side portions of the perimeter wall at the opposite ends of the floor plate. The pattern of impingement holes 66 is distributed both below the deflector 68 itself, as well as circumferentially outboard therefrom without being covered by the small deflector 68. In this way only a minor portion of the impingement holes is hidden below the small deflector 68, and a majority of the holes are not hidden by the deflector and are directly exposed to the cooling air circulating inside the baffle trough.

As shown in FIG. 5, the floor plate 64 is circumferentially arcuate to conform with the circumferential extent of the turbine shrouds. And, the deflector 68 is preferably circumferentially flat without curvature in the circumferential direction between the circumferentially opposite ends of the individual baffles and their floor plates.

The flat deflector is relatively small in size and impact area and permits the incoming cooling air from the hanger inlet to be distributed laterally upon impact with the outer surface of the deflector. The flat deflector is also easier to produce which decreases the cost thereof. In alternate embodiments the deflector may have various other configurations, including arcuate as desired for fitting within available space and maximizing the deflection capability thereof to protect the impingement holes from large gradients in static pressure of the cooling air.

Although the majority of the deflector 68 is preferably flat as illustrated in FIG. 5, the deflector in this embodiment preferably also includes opposite forward and aft flanges 72 which extend radially outwardly away from the floor plate 64 and are sized to abut the corresponding forward and aft portions of the perimeter wall. The two flanges may then be suitably attached thereto by line welds 74, for example. In this way, the deflector 68 becomes an integral part of the impingement baffle 62 and may be manufactured as a subassembly therewith for later assembly in the engine.

In the preferred embodiment illustrated in FIG. 4, the baffle 62 further includes a perimeter flange or band 76 integrally joined to the outer end of perimeter wall 70 which is configured to match the surface profile of the inner surface of the hanger 36 as illustrated in FIGS. 2 and 3. In this way, each impingement baffle may be brazed around the band 76 to the inner surface of the individual hangers 36 for providing a subassembly therewith. The deflector 68 is fixedly joined inside each baffle, and therefore forms an integral part of the hanger and baffle subassembly.

In this configuration, each turbine shroud 28 as illustrated in FIG. 2 will hang from the corresponding hanger 36 upon assembly therewith so that the impingement baffle 62 and its deflector 68 are disposed radially between the hanger and shroud in the small plenum defined therebetween.

Also in this configuration the flat deflector 68 is generally parallel to the floor plate 64 on its lower side, and faces the hanger 36 on its opposite upper side which is additionally disposed obliquely to the inlet 56 extending through the hanger.

In view of the small space for the hanger and impingement baffle, the inlet 56 extends primarily radially through the hanger and is radially aligned with the corresponding deflector 68. In other applications, the orientation of the hanger inlets 56 may also be angled axially and/or circumferentially with respect to the deflectors and impingement baffles.

Each baffle 62 preferably includes a single deflector 68 circumferentially centered therein. The single deflector corresponds with a single inlet 56 in the hanger provided for feeding the impingement baffle. And, as shown in FIG. 3, two of the impingement baffles 62 may be brazed to a common hanger 36, with the common hanger 36 having two inlets 56 of the type shown in FIG. 2, each corresponding with one of the impingement baffles and the corresponding deflector therein.

The arcuate impingement baffle 62 illustrated in FIG. 4 conforms with the arcuate plenum found under the correspondingly arcuate hanger 36, with the hanger inlet 56 extending radially through the hanger for providing air to the respective impingement baffle. The outer surface of each hanger defines with the inner surface of the surrounding shroud support 44 a larger annular channel or plenum in which the cooling air 14 is collected prior to distribution through the row of hanger inlets 56.

The row of inlets 58 in the shroud support 44 illustrated in FIG. 2 preferably extend radially therethrough, and are preferably circumferentially offset from the radial inlets 56 in the hangers. This may be effected by having different numbers of the hanger inlets 56 and support inlets 58 uniformly distributed around the circumference of the shroud.

As shown in FIG. 1, the inlets 60 in the outer casing 54 also preferably extend radially through the outer casing to channel the incoming cooling air into the relatively large annular plenum between the shroud support and the outer casing. The discharge ends of the casing inlets 60 preferably include tangentially inclined tubes for distributing circumferentially the large jets of incoming air provided by the fewer number of larger casing inlets 60.

The shroud cooling configuration disclosed above receives the full complement of cooling air through the casing inlets 60 and distributes that air circumferentially in turn through the shroud support inlets 58 and then the hanger inlets 56. The cooling air enters the individual baffles at high velocity which is substantially reduced upon impacting the corresponding deflectors.

After impact, the cooling air is deflected and channeled circumferentially or tangentially into the lower portion of the baffle trough or plenum at a higher and more uniform static pressure for more evenly distributing the impingement cooling air through the entire pattern of impingement holes. In this way, the full complement of impingement holes are better utilized for impingement cooling the back side of the individual turbine shrouds for enhanced cooling thereof which promotes shroud life with a given amount of shroud cooling air.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A turbine comprising:
   a row of turbine rotor blades extending radially outwardly from a rotor disk;
   a turbine shroud surrounding said blades;
   a shroud hanger surrounding and supporting said shroud, and including an inlet extending therethrough;
   a shroud support surrounding and supporting said hanger;
   an outer casing surrounding and supporting said shroud support;
   an impingement baffle disposed between said shroud and hanger, and including a perforate plate spaced radially therebetween; and
   an imperforate deflector spaced from said plate in alignment with said hanger inlet for laterally deflecting air discharged therefrom around said deflector to said perforate plate.

2. A turbine according to claim 1 wherein said plate is circumferentially arcuate , and said deflector is spaced inboard from circumferentially opposite ends thereof.

3. A turbine according to claim 2 wherein said plate is integrally joined to the bottom of a surrounding wall to form a trough, and said deflector is disposed inside said trough.

4. A turbine according to claim 3 wherein:
   said deflector bridges opposite forward and aft portions of said wall, and is spaced inboard from circumferentially opposite side portions of said wall at said opposite ends; and
   said perforate plate includes a pattern of impingement holes extending therethrough distributed both below said deflector, and outboard therefrom.

5. A turbine according to claim 4 wherein said plate is circumferentially arcuate, and said deflector is circumferentially flat.

6. A turbine according to claim 4 wherein said deflector is flat, and includes opposite forward and aft flanges extending outward from said plate and fixedly joined to said forward and aft wall portions.

7. A turbine according to claim 6 wherein said baffle is fixedly joined to said hanger and suspended above said shroud, and said deflector is fixedly joined to said baffle.

8. A turbine according to claim 7 wherein said deflector is generally parallel to said baffle plate on one side and faces said hanger on an opposite side obliquely to said inlet extending therethrough.

9. A turbine according to claim 8 wherein:
said shroud support includes a radial inlet extending therethrough for channeling air to said hanger inlet; and
said outer casing includes a radial inlet extending therethrough for channeling air to said support inlet.

10. A turbine according to claim 9 wherein:
said baffle includes a single deflector circumferentially centered therein; and
said hanger includes a single inlet radially aligned with said single deflector.

11. A turbine shroud impingement baffle comprising:
a perforate plate having a pattern of impingement holes therein; and
an inboard deflector spaced from said plate and being smaller than said plate for deflecting inlet air around said deflector to said holes.

12. A baffle according to claim 11 wherein said plate is arcuate, and said deflector is spaced inboard from circumferentially opposite ends thereof.

13. A baffle according to claim 12 wherein said plate is integrally joined to the bottom of a surrounding wall to form a trough, and said deflector is disposed inside said trough.

14. A baffle according to claim 13 wherein:
said deflector bridges opposite forward and aft portions of said wall, and is spaced inboard from opposite side portions of said wall at said opposite ends; and
said pattern of holes in said plate is distributed both below said deflector, and outboard therefrom.

15. A baffle according to claim 14 wherein said plate is circumferentially arcuate, and said deflector is circumferentially flat.

16. A baffle according to claim 14 wherein said deflector is flat, and includes opposite forward and aft flanges extending outward from said plate and fixedly joined to said forward and aft wall portions.

17. A baffle according to claim 12 in combination with an arcuate shroud hanger having an inlet extending therethrough, and said deflector is imperforate and aligned with said inlet for laterally deflecting air channeled therethrough.

18. A combination according to claim 17 further comprising a turbine shroud hanging from said hanger, with said impingement baffle and deflector being disposed radially therebetween.

19. A combination according to claim 18 wherein said baffle is fixedly joined to said hanger and suspended above said shroud, and said deflector is fixedly joined to said baffle.

20. A combination according to claim 19 wherein said deflector is generally parallel to said baffle plate on one side and faces said hanger on an opposite side obliquely to said inlet extending therethrough.

* * * * *